Patented June 24, 1930

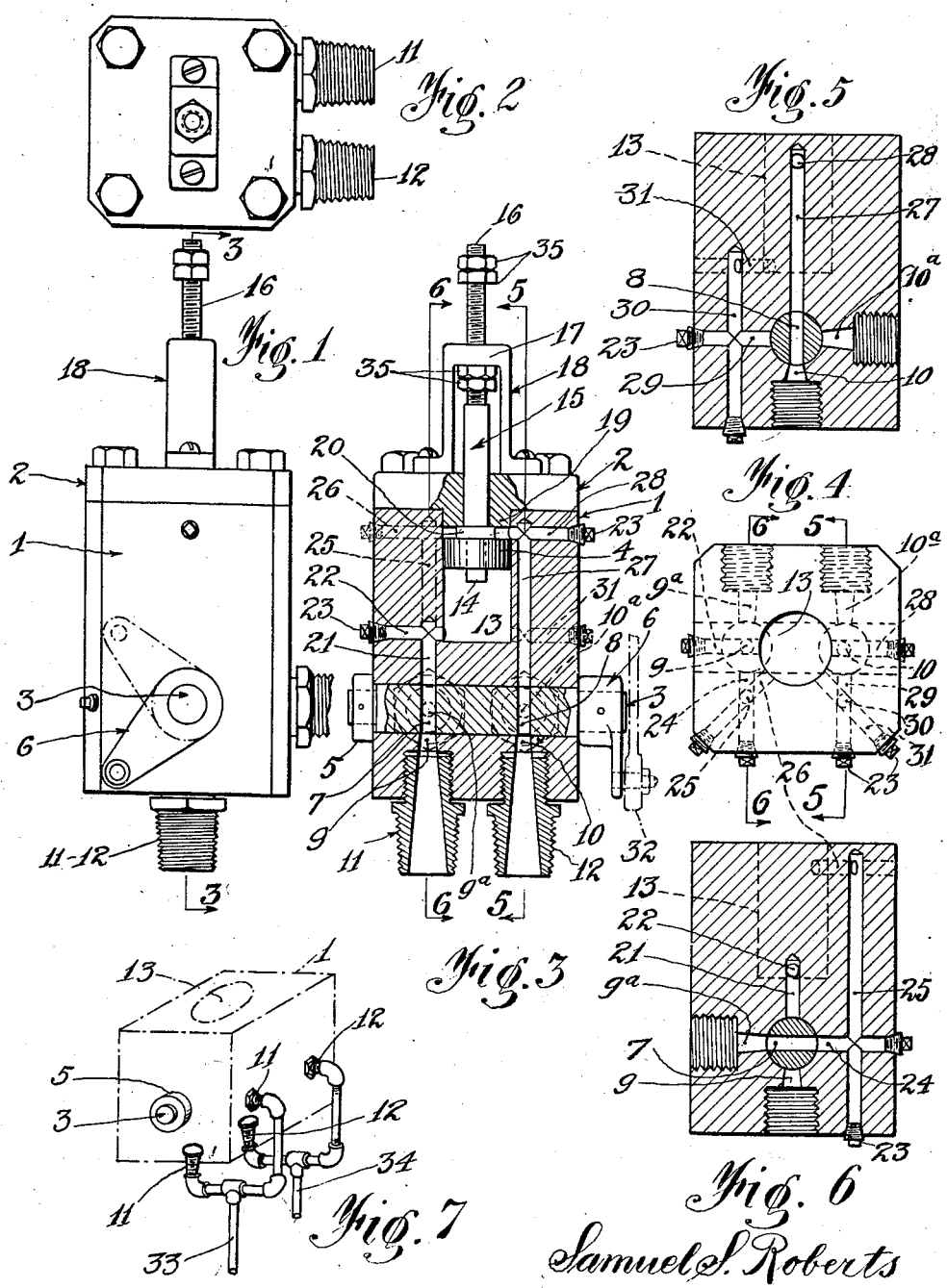

1,767,552

UNITED STATES PATENT OFFICE

SAMUEL S. ROBERTS, OF PITTSBURGH, PENNSYLVANIA, ASSIGNOR OF ONE-HALF TO JOHN H. BULLEN, OF OAKMONT, PENNSYLVANIA

LUBRICATING VALVE

Application filed July 3, 1928. Serial No. 290,097.

This invention relates to lubricating valves intended to be used more in particular with lubricating greases.

The primary object of this invention is to provide a lubricating valve having a reciprocable piston adapted for operation without the use of springs and in which the piston is reciprocated intermittently by the fluid pressure of the lubricant. Another object is to provide a lubricating valve in which the amount of grease delivered at every stroke of the piston may be regulated to suit the requirements of the installation wherein used. A further object is the provision of a lubricating valve which is very simple in construction, positive in operation and which can be manufactured at relatively low cost. Additional features and advantages of this invention will appear from the following description considered in connection with the accompanying drawing.

In the drawing:

Fig. 1 is a front elevation of the lubricating valve.

Fig. 2 is a top plan view of Fig. 1, the operating lever and the valve plug having been omitted.

Fig. 3 is a sectional view taken on line 3—3, Fig. 1, some portions being shown in elevation.

Fig. 4 is a top plan view of the body portion, the cap thereof having been removed.

Fig. 5 is a sectional view taken on line 5—5, Figs. 3 and 4, through the valve body.

Fig. 6 is a sectional view taken on line 6—6, in Figs. 3 and 4, through the valve body showing the valve plug turned 90 degrees from the position shown in Fig. 5.

Fig. 7 is a fragmentary perspective view showing the connections of the valve inlets and outlets to a lubricating system.

A lubricating valve built according to this invention comprises a main valve-body 1, a cap 2, a valve-plug 3 and a displacement piston or plunger 4.

The valve-body 1 is bored through to receive the close fitting rotatable valve-plug 3 which is held in place on the valve body by means of a collar 5 and an operating lever 6, both suitably secured to the valve-plug. In the latter are drilled in spaced relation the two diametral valve ports 7 and 8 running in the same direction. Valve port 7 may communicate with the two rectangularly disposed inlet ports 9 and 9$^a$, whereas the valve port 8 may communicate with the rectangularly disposed outlet ports 10 and 10$^a$. The sets of ports 9 and 10 are connected to the piping of the lubricating system by means of pipe bushings 11 and 12 screwed into the valve-body and preferably bored conically, as plainly shown in Fig. 3.

The valve-body is suitably bored at right angles to the valve-plug and above the same to produce the grease cylinder 13 in which the close fitting floating piston 4 may be reciprocated. The latter is secured on the end 14 of the piston-rod 15, the upper end 16 of which is threaded and passes through the bridge portion 17 of the yoke 18 mounted on the cap 2 having a central hub 19 hermetically fitted in the cylinder or container 13.

In order not to cover the various ducts leading into the cylinder, the piston 4 is prevented from touching the ends of the cylinder by the flange 20 provided on the piston-rod and by the protruding portion of the piston end 14. The piston rod is guided in the cap 2 by a close fitting aperture which eliminates the use of a stuffing box. However, a stuffing box of any ordinary type could be provided, if found desirable.

The inlet port 9 communicates with the lower end of the cylinder 13 through ducts 21 and 22, the latter being drilled from the outside and closed at its outer end by a removable pipe-plug 23 to allow for the occasional cleaning of said duct. The inlet port 9ª connects with the upper end of the cylinder through the ducts 24, 25 and 26, also drilled from the outside of the valve body and closed by plugs 23.

The outlet port 10 communicates with the upper end of the cylinder by the ducts 27 and 28, while the outlet port 10ª is connected to the lower end of the cylinder by means of the ducts 29, 30, 31, also closed at their outer ends by pipe plugs 23, for the reason stated.

The operating lever 6 may be operated by a connecting rod 32 which is preferably connected to a system of levers automatically actuated, at suitable intervals, by a quick acting electro-magnet, not shown. The amount of rotation imparted to the valve-plug would be, in the present case, equal to 90 degrees in order to bring the valve ports 7 and 8 in communication with their respective angularly disposed inlet and outlet ports.

The inlet ports 9 and 9ª are connected to a grease storage tank (not shown) by means of the branched pipe connection 33, and the outlet ports are connected to the parts to be lubricated by a similar pipe connection 34, as indicated in Fig. 7. The lubricant is delivered to the inlet ports under pressure produced either mechanically or hydrostatically.

The valve operates as follows: When the valve plug has been moved by the connecting rod 32 in the position shown in Figs. 3, 5, the lubricant under pressure will flow from the pipe line 33 through the inlet port 9, the valve port 7 and the ducts 21, 22 into the lower end of the cylinder, thus forcing the piston up as far as it is set for to go.

Assuming that there be grease in the cylinder above the piston, the grease will be forced to the part, or parts, to be lubricated by passing through the ducts 28, 27 into the discharge pipe 34.

When the valve plug is turned about 90 degrees into the position shown in Fig. 6, the grease will flow from the supply pipe 33 into the inlet port 9ª and through the ducts 24, 25 and 26 into the upper part of the cylinder 13, above the piston 4. At the same time the lower part of the cylinder will be connected to the discharge pipe 34 by the ducts 31, 30, 29, the valve-port 8 and the outlet port 10ª.

The fluid pressure of the incoming grease will, of course, move the piston down and force the grease on the underside of the piston into the discharge line 34. By properly timing the frequency of operation of the valve plug, any amount of grease may be shot into the parts to be lubricated, during a stated period.

On both sides of the yoke-bridge 17 are placed on the threaded stem 16 of the piston rod the adjusting nuts 35, the purpose of which is to vary the amount of lubricant delivered at each stroke of the piston by regulating the travel thereof.

While the illustrated example constitutes a practical embodiment of my invention, I do not wish to limit myself strictly to the mechanical details herein illustrated, since the same could be considerably varied without departing from the scope of the invention as defined in the appended claims.

I claim:

1. In a lubricating valve comprising a valve-body having a lubricant container co-axially disposed therein, two inlet connections disposed in angular relation to each other on said body and two similarly disposed outlet connections; a piston movable within the container and a valve-plug disposed at right angles to the container and rotatable within the body; said valve-plug having a straight diametral inlet-port and a straight diametral outlet-port, each port being adapted to register with either one of its corresponding inlet and outlet connections; said valve-body having a set of ducts formed within the valve-body for connecting the inlet-port with the container at either side of the piston and another set of ducts similarly formed and adapted to connect the outlet port with the container at either side of the piston.

2. In a lubricating valve comprising a valve-body having a co-axially disposed lubricant container hollowed out therein, two inlet connections disposed in angular relation to each other on said body and two similarly disposed outlet connections; a floating piston movable by said lubricant within the container; a valve-plug disposed at right angles to the container and rotatable within the body; said valve-plug having a straight diametral inlet port and a straight diametral outlet port parallel to the inlet port, each port being adapted to register with either one of its corresponding inlet and outlet connections; said valve body having a set of ducts formed within the valve body for connecting the inlet port with the container at either side of the piston and another set of ducts similarly formed and adapted to connect the outlet port with the container at either side of the piston.

3. In a lubricating valve comprising a valve-body having a co-axially disposed lubricant container hollowed out therein, two inlet connections disposed in angular relation to each other on said body and two similarly disposed outlet connections; a floating piston movable by said lubricant within the container; a valve-plug disposed at right angles to the container and rotatable within the body; said valve-plug having a straight diametral inlet port and a straight diametral outlet port parallel to the inlet port, each port being adapted to register with either one of its corresponding inlet and outlet connections; said valve-body having a set of ducts formed within the valve-body for connecting the inlet port with the container at either side of the piston and another set of ducts similarly formed and adapted to connect the outlet port with the container at either side of the piston, and removable means providing outward access to said sets of ducts for the purpose of cleaning the same.

In testimony whereof I affix my signature.

SAMUEL S. ROBERTS.